(12) United States Patent
Kim

(10) Patent No.: US 6,788,352 B2
(45) Date of Patent: Sep. 7, 2004

(54) TELEVISION BASED ON OPERATING SYSTEM AND METHOD OF DISPLAYING AN INITIAL SCREEN THEREOF

(75) Inventor: Jae-Ik Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 434 days.

(21) Appl. No.: 09/932,998

(22) Filed: Aug. 21, 2001

(65) Prior Publication Data
US 2002/0024616 A1 Feb. 28, 2002

(30) Foreign Application Priority Data
Aug. 23, 2000 (KR) ........................................ 2000-48973

(51) Int. Cl.[7] ................................................ H04N 5/44
(52) U.S. Cl. ..................... 348/553; 348/552; 348/725; 348/714
(58) Field of Search ................................ 348/552, 725, 348/553, 731, 730, 7, 10, 12, 11, 714, 719; 725/132, 140, 152, 134, 142; H04N 5/44

(56) References Cited

U.S. PATENT DOCUMENTS

| | | | | |
|---|---|---|---|---|
| 5,737,527 A | * | 4/1998 | Shiels et al. ................. | 725/114 |
| 5,771,064 A | * | 6/1998 | Lett ............................. | 725/134 |
| 6,178,503 B1 | * | 1/2001 | Madden et al. ................ | 713/2 |
| 6,651,250 B1 | * | 11/2003 | Takai ........................... | 725/31 |

* cited by examiner

Primary Examiner—Michael H. Lee
Assistant Examiner—Trang U. Tran
(74) Attorney, Agent, or Firm—Robert E. Bushnell, Esq.

(57) ABSTRACT

A television based on an operating system, including: a first memory storing a boot loader program, the boot loader program performing a hardware basic test and a booting; a television signal generating portion outputting a television broadcast; a second memory storing a MPEG control program and preset channel information, the MPEG control program driving the television signal processing portion to output a video signal corresponding to a received television broadcast corresponding to the stored preset channel information; and a central processing unit executing the boot loader program, executing the MPEG control program after the hardware basic test of the boot loader program and loading the operating system onto a random access memory after the MPEG control program drives the television signal processing portion to output the video signal corresponding to the received television broadcast corresponding to the stored preset channel information.

20 Claims, 6 Drawing Sheets

Fig 2 *RELATED ART*

TELEVISION BASED ON OPERATING SYSTEM AND METHOD OF DISPLAYING AN INITIAL SCREEN THEREOF

CLAIM OF PRIORITY

This application makes reference to, incorporates the same herein, and claims all benefits accruing under 35 U.S.C § 119 from an application entitled Television Based on Operating System and Method of Displaying an Initial Screen Thereof earlier filed in the Korean Industrial Property Office on Aug. 23, 2000, and there duly assigned Ser. No. 2000-48973 by that Office.

BACKGROUND OF THE INVENTION

1. Field of the invention

The present invention relates to a television based on an operating system (OS) and a method of displaying an initial screen.

2. Description of Related Art

A television based on an operating system, for example, a computer-based television and a set top box, cannot be viewed by a viewer until a booting process is completed. When the power is supplied to the television, the central processing unit (CPU) executes a boot loader program stored in a ROM to perform the booting process. Then, the viewer can view the television broadcast after an application program is executed. The boot loader program is programmed to check a main memory, the ROM, the devices mounted on peripheral component interconnect (PCI) slots, a hard disk, and a floppy disk, and to load the operating system (OS) into the main memory to boot the system. Such a digital television is constructed to be based on the operating system, and thus the user cannot manipulate the television until the loading of the operating system is completed. However, since a time to execute the boot loader program is lengthy, the user could wait for a long time (about 10 to about 30 seconds) without being able to view the television broadcast.

An example of a computer-based television is provided by U.S. Pat. No. 6,209,044 to Mark P. Vaughan entitled Method And Apparatus For Controlling A Display Monitor In A PC/TV Convergence System.

Hereinafter, a configuration and an initial screen display method of a television based on an operating system being contemplated by the Assignee of the present invention are explained in detail, centering on the computer-based television.

FIG. 1 is a block diagram illustrating a configuration of a computer-based television. As shown in FIG. 1, the computer-based television includes a central processing unit (CPU) 10, a ROM 20, a random access memory (RAM) 30, a north and south bridge 40, a hard disk drive (HDD) 50, a PCI bridge 60, and a television card 70.

CPU 10 executes the boot loader program stored in the ROM 20 when power is supplied to the television. RAM 30 loads the operating system and the application programs, which are stored in HDD 50, by a control of CPU 10. At this point, since CPU 10 has only a CPU core, CPU 10 requires a bridge that connects it with chips having different interfaces to connect external chips. A chip to connect CPU 10 with ROM 20, RAM 30, and a PCI bus is called the "north bridge". Similarly, a chip to connect a PCI bridge with HDD 50, a USB (not shown), a UART (not shown), peripheral integrated circuits (ICs: not shown), and the like is called the "south bridge". The north and south bridge 40 is referred to as a chip that incorporate the north bridge and the south bridge. The PCI bridge 60 serves as an intermediate connection unit to connect various chips with the PCI bus. Even though not shown, a graphic card, a sound card and the like are included.

Television card 70 includes a tuner 71, a channel decoder 72, a transport stream demultiplexer 73, a video decoder 74, an audio decoder 75, and first and second digital-to-analog converters 76 and 77. Tuner 71 receives a broadcasting wave of a certain frequency from an antenna (not shown) under a control of CPU 10. Channel decoder 72 converts the broadcasting wave from tuner 71 into a transport stream. Transport stream demultiplexer 73 converts the transport stream output from channel decoder 72 into an audio packet stream and a video packet stream. Video decoder 74 restores the video packet stream, and audio decoder 75 restores the audio packet stream. Digital-to-analog converter 76 converts a digital video signal output from video decoder 74 into an analog video signal and outputs it to be displayed on a screen (not shown). Digital-to-analog converter 77 converts a digital audio signal output from audio decoder 75 into an analog audio signal and outputs it to a speaker (not shown).

FIG. 2 is a flowchart illustrating an initial screen display method of the computer-based television of FIG. 1. First, CPU 10 checks whether power is supplied on or not. When power is supplied, CPU 10 executes the boot loader program stored in ROM 20 (step 210). The boot loader program performs a hardware basic test. For example, it checks ROM 20, RAM 30, HDD 50, and other various devices mounted therein (step 220). CPU 10 then loads the operating system, stored in HDD 50, into RAM 30 (step 230). CPU 10 loads the application programs stored in the HDD 50 into RAM 16 (step 240). The CPU 10 then performs an application program (step 250). CPU 10 then processes an input of a user (step 260). In other words, in order to view a television broadcast output through television card 70, the user waits to execute the application program until after a completion of the booting process.

Even though not explained, a set top box according to the related art also is operated in a similar manner to the computer-based television.

As described above, since the application programs cannot be executed until after the loader program performs the system booting completely, the television based on the operating system can be viewed only after a completion of the system booting process, whereupon there comes the problem in that the user waits for a long time (about 10 to about 30 seconds) without viewing the television broadcast.

For the foregoing reasons, there is a need for a television based on an operating system in which the viewer can view a television broadcast directly after the television is turned on. U.S. Pat. No. 5,838,383 to Hiroyuki Chimoto et al. entitled Multimedia Television Receiver And Method Of Booting The Same teaches that while the CPU is performing bootstrap processing immediately after the power switch of the television receiver is turned on, a DMA device is initialized, causing a monitor to display a television image being received, no matter whether an operating system has been activated or not. While the television image is being displayed the CPU continues to perform the bootstrap processing in order to activate the operating system.

SUMMARY OF THE INVENTION

To overcome the problems described above, preferred embodiments of the present invention provide a television based on an operating system in which a viewer can view a television broadcast before completion of a system booting process.

Another object of the present invention is to provide a method of displaying an initial screen of a television based on an operating system to enable a viewer to view the television broadcast before completion of the system booting process.

In order to achieve the above objects, the preferred embodiments of the present invention provide a television based on an operating system, including: a first memory storing a boot loader program, the boot loader program performing a hardware basic test and a booting process; a television signal generating portion outputting a television broadcast; a second memory storing a MPEG (Moving Pictures Expert Group) control program and channel information, the MPEG control program driving the television signal generating portion to output the television broadcast corresponding to the channel information; and a central processing unit executing the boot loader program and executing the MPEG control program after the hardware basic test of the boot loader program.

The preferred embodiment of the present invention further provides a method of displaying an initial screen of a television based on an operating system, the television including a boot loader program, a MPEG program, and a channel information, including: executing the boot loader program to perform a hardware basic test; executing the MPEG control program to output a television broadcast of a channel corresponding to the channel information; and completing a booting.

The first memory is a read only memory (ROM). The second memory is one of a nonvolatile memory and is one of a flash memory and an EEPROM. The first and second memories may be the same memory, and the first and second memories are one of a flash memory and an EEPROM. The second memory further stores a volume channel. The television signal generating portion is a television card including a tuner, a channel decoder, a demultiplexer, audio and video decoders, and first and second digital-to-analog converters.

Using the television based on the operating system according to the preferred embodiment of the present invention an initial screen can be displayed before a system booting is completely performed. Therefore, the viewer can view the television without waiting for a long time.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Reference will now be made in detail to a preferred embodiment of the present invention, example of which is illustrated in the accompanying drawings.

Figure 1:
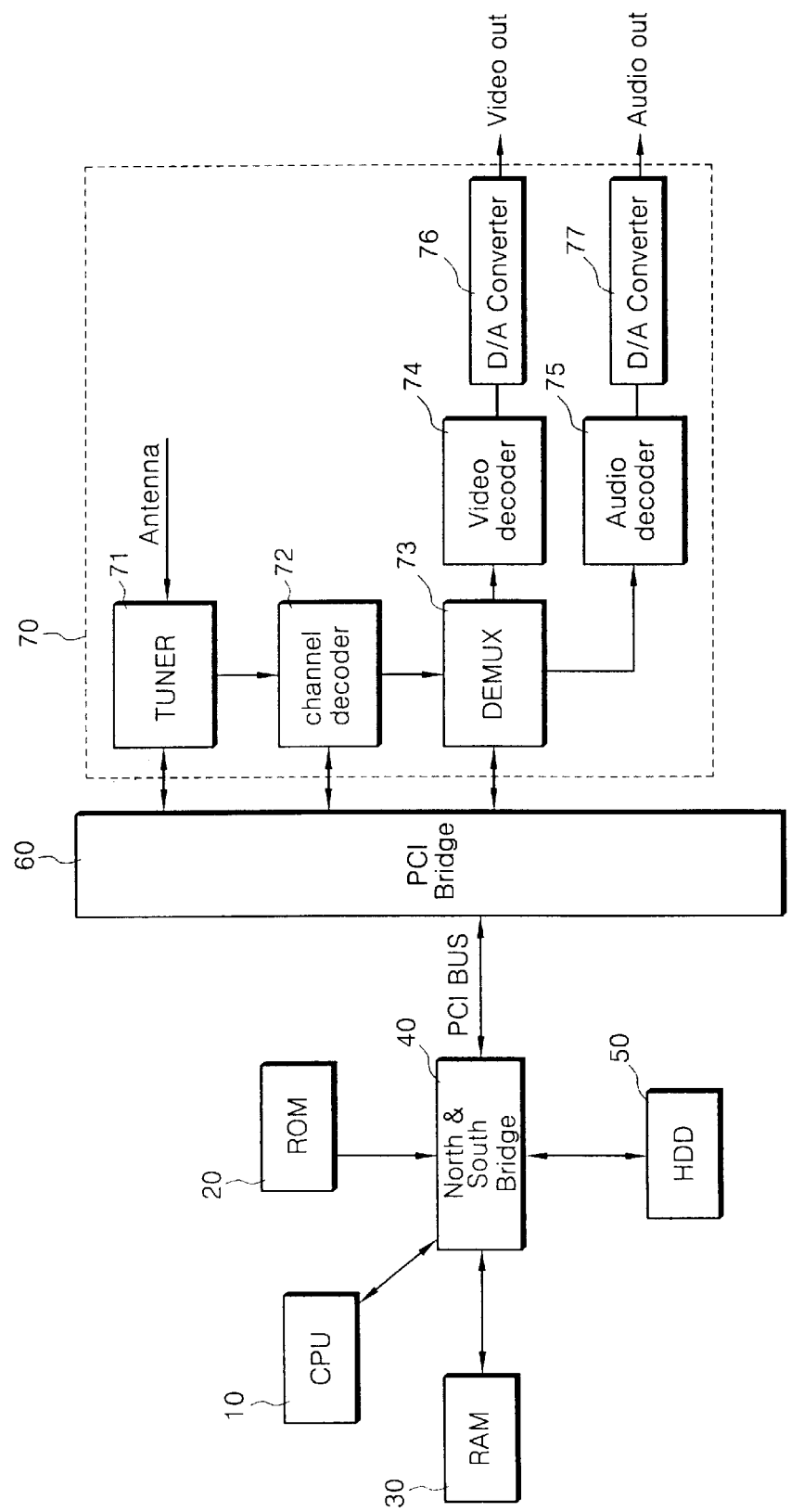
FIG. 1 is a block diagram illustrating a configuration of a computer-based television.
Figure 2:
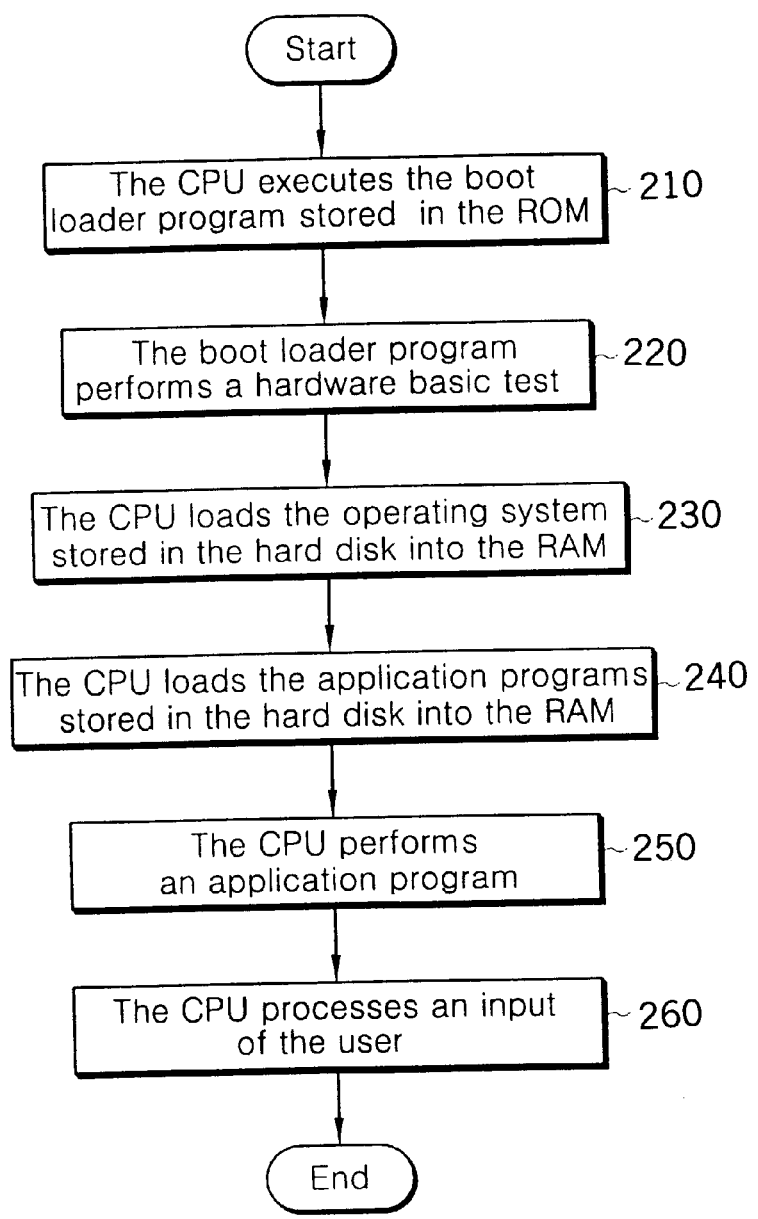
FIG. 2 is a flow chart illustrating an initial screen display method of the television based on the operating system of FIG. 1.
Figure 3:
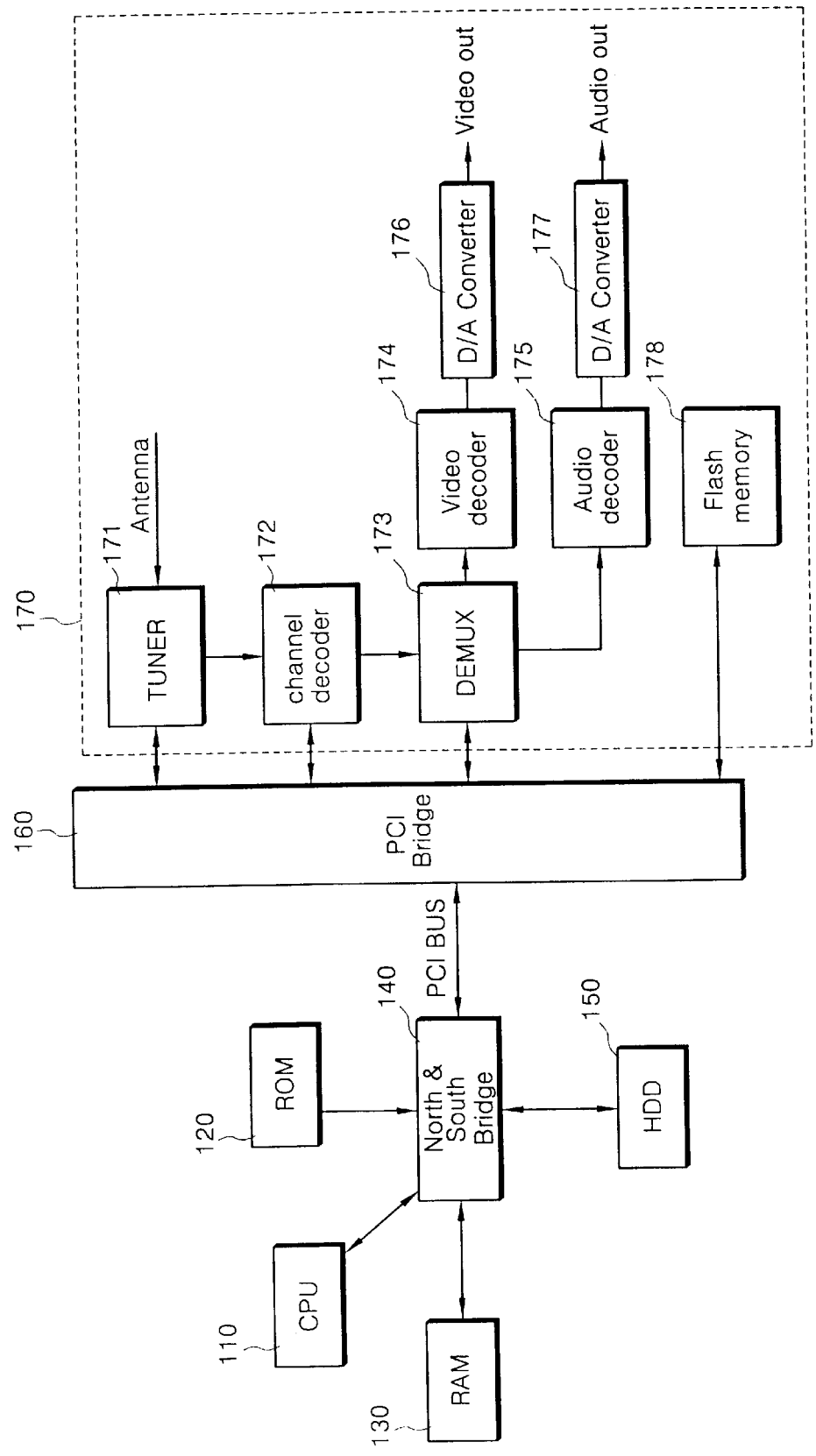
FIG. 3 is a block diagram illustrating a computer-based television according to a preferred embodiment of the present invention.

FIG. 3 is a schematic block diagram illustrating a computer-based television according to the preferred embodiment of the present invention. As shown in FIG. 3, the computer-based television according to the preferred embodiment of the present invention includes a central processing unit (CPU) 110, a read only memory (ROM) 120, a random access memory (RAM) 130, a north and south bridge 140, a hard disk drive (HDD) 150, a peripheral component interconnect (PCI) bridge 160, and a television card 170.

CPU 110 executes the boot loader program stored in ROM 120 when the television is turned on. CPU 110 further detects whether data in ROM 12 indicates whether any additional ROM exists or not during a hardware basic test of the boot loader program. When the additional ROM exists, CPU 110 passes a control function over the additional ROM while stopping the booting process. The additional ROM executes a program stored therein to drive television card 170 and the television broadcast is viewed by the user. At this time the program in the additional ROM passes control back to the boot loader program which continues the booting operation. It may be set by the user in advance whether the program in the additional ROM is executed or not before completing the booting operation.

During the continued booting process, RAM 130 loads the operating system and the application programs, which are stored in HDD 150, by a control of the CPU 10. At this point, since CPU 110 has only a CPU core, CPU 110 requires a bridge that connects it with chips having different interfaces to connect external chips. A chip to connect CPU 110 with ROM 120, RAM 130, and a PCI bus is called a "north bridge". Similarly, a chip to connect a PCI bridge with HDD 50, a USB, a UART, a peripheral integrated circuit (IC: not shown), and the like is called a "south bridge". A chip that incorporate the north bridge and the south bridge is referred to as a north and south bridge 140. A PCI bridge 160 is one which serves as an intermediate connection unit to connect various chips with the PCI bus. Even though not shown, a graphic card, a sound card and the like are included in the system.

Television card 170 includes a tuner 171, a channel decoder 172, a transport stream demultiplexer 173, a video decoder 174, an audio decoder 175, digital-to-analog converters 176 and 177, and a nonvolatile memory 178. Tuner 171 receives a broadcasting wave of a certain frequency from an antenna (not shown, or cable, satellite, VCR, digital disk, or other broadcast media) under a control of CPU 110.

Channel decoder 172 converts the broadcasting wave from tuner 171 into a transport stream. Transport stream demultiplexer 173 converts the transport stream output from channel decoder 172 into an audio packet stream and a video packet stream. Video decoder 174 restores the video packet stream a digital video signal, and audio decoder 175 restores the audio packet stream into a digital audio signal. Digitalto-analog converter 176 converts the digital video signal into an analog video signal and outputs it to be displayed on a screen (not shown). Digital-to-analog converter 177 converts the digital audio signal into an analog audio signal and outputs it to a speaker (not shown).

Nonvolatile memory 178 acts as the additional ROM described above. Nonvolatile memory 178 stores channel information and volume information of a television broadcast which the user wants to view when the television is turned on. The channel information and volume information of the television broadcast may be set by the user through the application program. In other words, the user can set, in advance, a channel of the television broadcast and turn up or down a sound volume through the application program. Nonvolatile memory 178 further stores an audio program ID and a video program ID to inform demultiplexer 173 which video and audio programs are used for the television broadcast. The audio and video program IDs may be set, in advance, through the application program.

Also, an audio/video present flag is stored in nonvolatile memory 178 so that it is determined in advance whether or not the television broadcast is to be viewed before completion of the booting process. Such informations are not deleted even though the television is turned off.

Nonvolatile memory 178 further stores a MPEG control program for driving television card 170 to output the audio and video signals in order to enable the viewer to view a television broadcast before the booting process is completed. In other words, when the television is turned on, the MPEG control program first checks the audio/video present flag. When the audio/video present flag is set such that the television broadcast is to be viewed before the booting process is completed, the MPEG control program sets the channel information and the volume information in tuner 171 and initializes channel decoder 172, demultiplexer 173, audio decoder 174 and video decoder 175.

The MPEG control program further sets the audio and video program IDs in demultiplexer 173. Therefore, television card 170 is driven, and a television broadcast of a channel set in advance can be viewed by the viewer before completion of the booting process. Thereafter, the MPEG control program passes a control function over the boot loader program to complete a booting.

An EEPROM, a flash memory or the like may be used as nonvolatile memory 178. At this point, even though nonvolatile memory 178 is mounted on television card 170, nonvolatile memory 178 may be incorporated into HDD 150, or nonvolatile memory 178 may be arranged independent of HDD 150 and television card 170.

Figure 4:
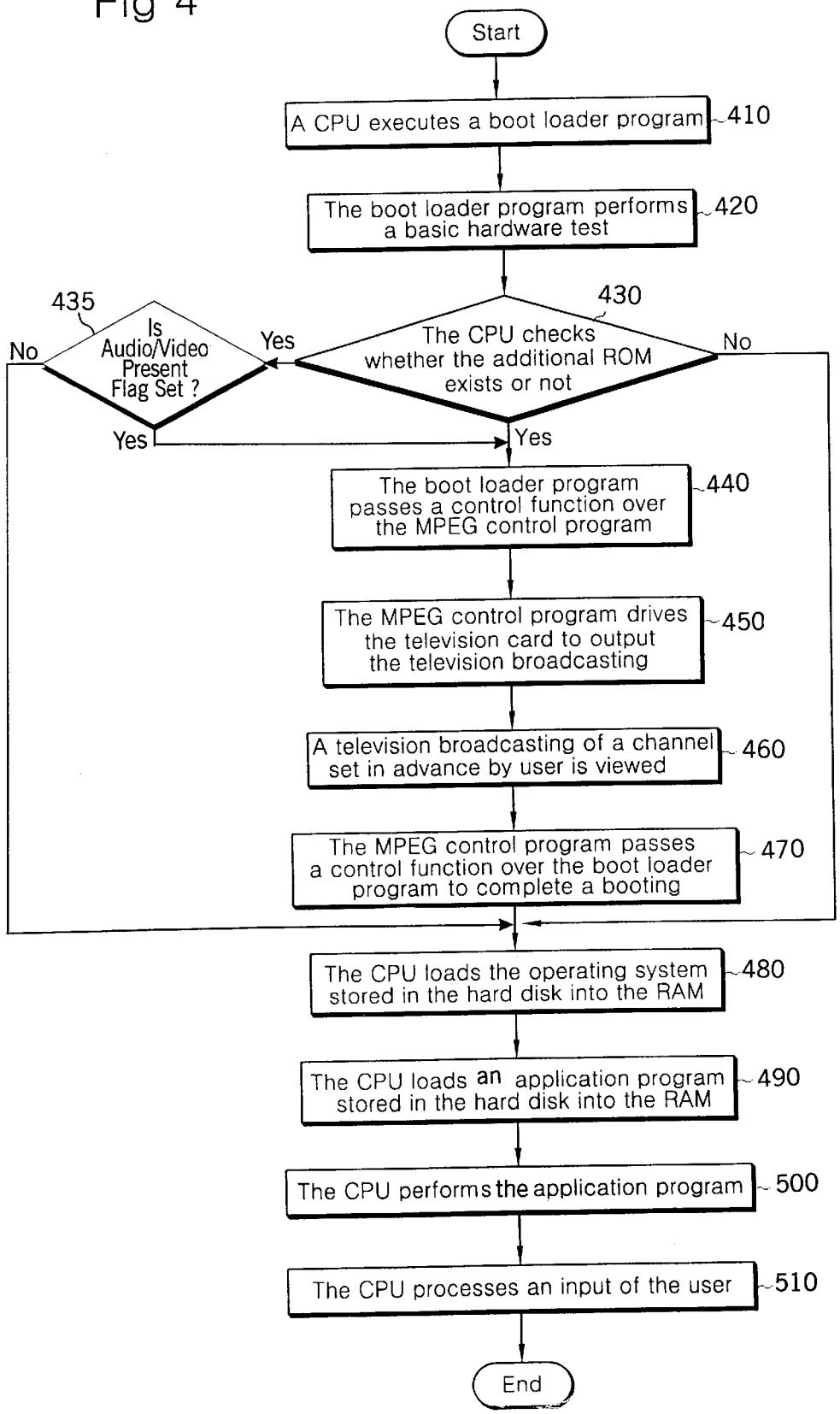
FIG. 4 is a flow chart illustrating an initial screen display method of the computer-based television according to the preferred embodiment of the present invention

FIG. 4 is a flowchart illustrating a method of displaying an initial screen of the computer-based television according to the preferred embodiment of the present invention. First, when the television is turned on, CPU 110 executes the boot loader program (step 410). The boot loader program performs a basic hardware test (step 420). At the same time, CPU 110 checks whether the additional ROM (i.e., the nonvolatile memory 178) exists or not (step 430).

When the additional ROM exists, CPU 110 checks whether the audio/video present flag is set to execute the MPEG control program or not (step 435). When the audio/video present flag is set to execute the MPEG control program, the boot loader program passes a control function over to the MPEG control program (step 440). The MPEG control program drives television card 170 to output the television broadcast (step 450). That is, the MPEG control program sets in tuner 171 the channel information and the volume information, which are stored in nonvolatile memory 178, to receive the television broadcast of a channel that is set in advance by the user. The MPEG control program also initializes channel decoder 172, demultiplexer 173, audio decoder 174 and video decoder 175. The MPEG control program further sets the audio and video program IDs in demultiplexer 173. Therefore, a television broadcast of a channel that is set in advance by a user can be viewed before a completion of the booting process (step 460). Thereafter, the MPEG control program passes a control function over the boot loader program to complete the booting process (step 470). Following step 470, or when CPU 110 determines in step 430 that additional ROM (i.e., the nonvolatile memory 178) does not exist, or when CPU 110 determines in step 435 that the audio/video present flag is not set to execute the MPEG control program, the process goes to step 480.

Instep 480, CPU 110 loads the operating system stored in HDD 150 into RAM 130. Thus the booting process is completely performed.

CPU 110 then loads an application program stored in HDD 150 into RAM 130 (step 490). Thereafter, CPU 110 performs the application program (step 500). Then CPU 110 processes an input of the user (step 510). In other words, in order to view the television broadcast output through the television card, the user should execute the corresponding application program after completion of the booting process.

Figure 5:
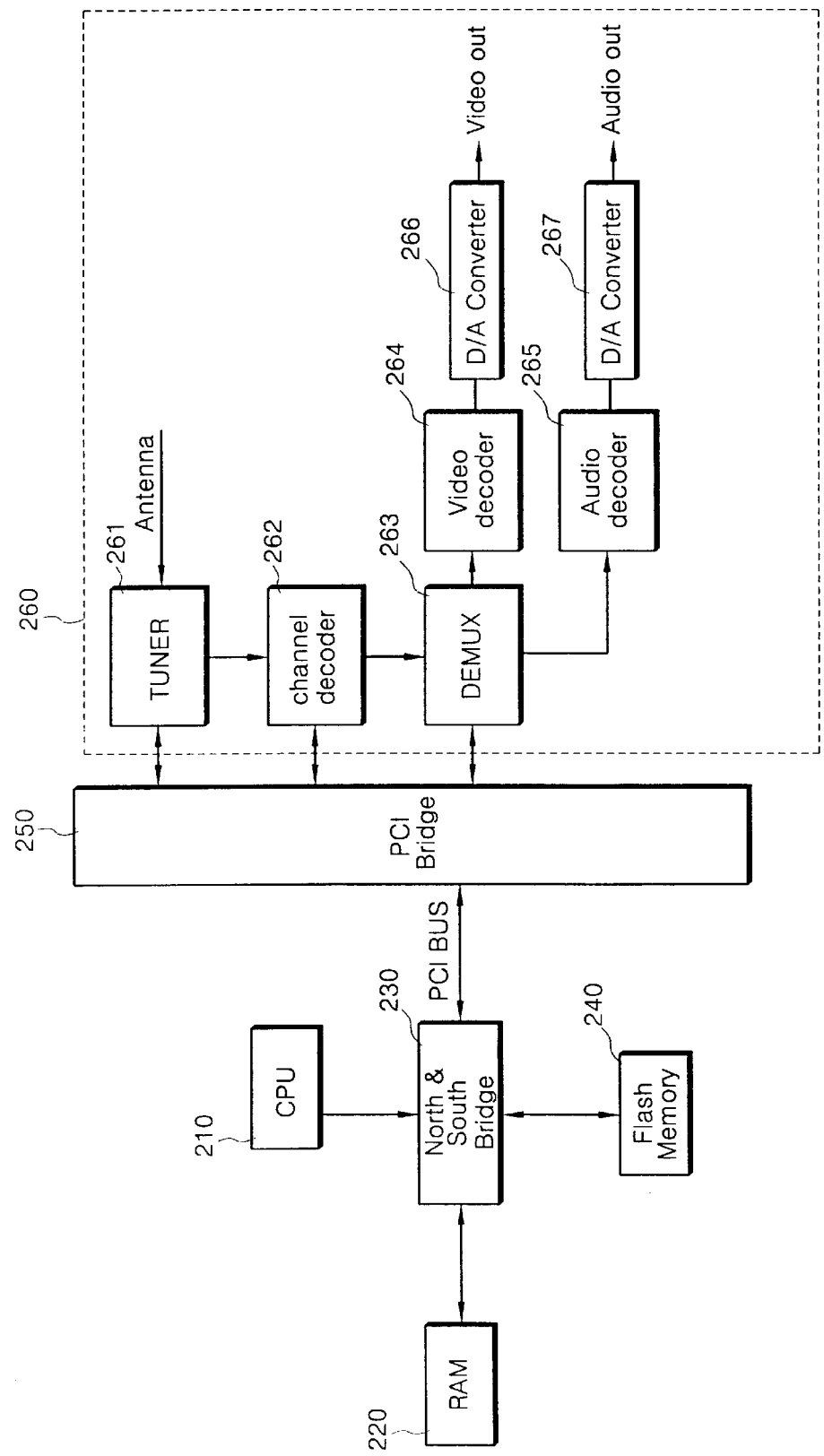
FIG. 5 is a block diagram illustrating a set top box according to the preferred embodiment of the present invention.

FIG. 5 is a block diagram illustrating a set top box according to the preferred embodiment of the present invention. As shown in FIG. 5, the set top box includes a central processing unit (CPU) 210, a random access memory (RAM) 220, a north and south bridge 230, a nonvolatile memory (ROM, EEPROM or flash memory) 240, a peripheral component interconnect (PCI) bridge 250, and a television signal generating portion 260. Note that CPU 210, RAM 220, north and south bridge 230, and PCI bridge 250 can perform the same functions as those in the computer-based television of FIG. 3.

Nonvolatile memory 240 is one which incorporates HDD 150 and nonvolatile memory 178 of FIG. 3 and is divided into four regions. A first region stores the boot loader program. A second region stores the operating system and the application programs. A third region stores the channel information, the volume information, the audio and video program IDs, and the audio/video present flag. A fourth region stores the MPEG control program. That is, the third and fourth regions of nonvolatile memory 240 substitute for a function of nonvolatile memory 178 of the computer-based television.

The television signal generating portion 260 includes a tuner 261, a channel decoder 262, a transport stream demultiplexer 263, a video decoder 264, an audio decoder 265, and digital-to-analog converters 176 and 177. Components of television signal generating portion 260 perform the same functions as those of television card 170 of the computer-based television. Television card 170 of FIG. 3 is removably mounted in PCI bridge 160, but components of television signal generating portion 260 are integrally formed and thus are non-detachable.

Figure 6:
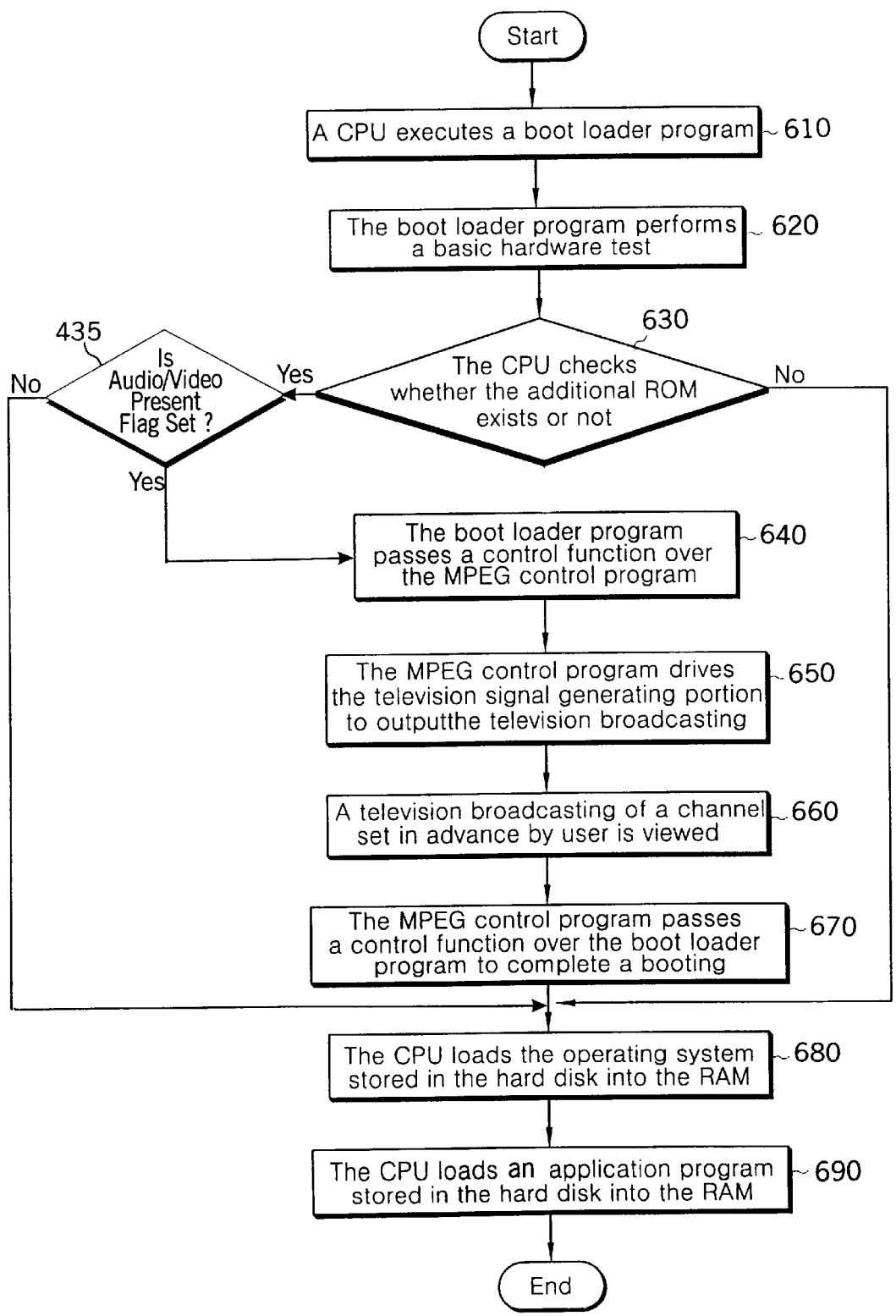
FIG. 6 is a flow chart illustrating an initial screen display method of the set top box according to the preferred embodiment of the present invention.

FIG. 6 is a flowchart illustrating a method of displaying an initial screen of the set top box according to the preferred embodiment of the present invention. First, when the television is turned on, CPU 210 executes the boot loader program (step 610). The boot loader program performs a basic hardware test (step 620). At the same time, CPU 210 checks whether the additional ROM exists or not (step 630).

When the additional ROM exists, CPU 210 checks whether the audio/video present flag is set to execute the MPEG control program or not (step 635). When the audio/video present flag is set to execute the MPEG control program, the boot loader program passes a control function over to the MPEG control program (step 640). The MPEG control program drives television signal generating portion 260 to output the television broadcast (step 650). That is, the MPEG control program sets, in tuner 261, the channel information and the volume information, which are stored in the nonvolatile memory 240, to receive the television broadcast of a channel that is set in advance by the user. The MPEG control program also initializes channel decoder 262, demultiplexer 263, audio decoder 264 and video decoder 265. The MPEG control program further sets the audio and video program IDs in demultiplexer 263 (step 660). Therefore, a television broadcast of a channel that is set in advance by user can be viewed before a completion of a booting.

Thereafter, the MPEG control program passes a control function over to the boot loader program to complete the booting process (step 670).

Following step 670, or when CPU 210 determines in step 630 that additional ROM does not exist, or when CPU 210 determines in step 635 that the audio/video present flag is not set to execute the MPEG control program, the process goes to step 680.

Subsequently, CPU 210 loads the operating system stored in nonvolatile memory 240 into RAM 220 (step 680), thereby completing the booting process. Then, CPU 210 load an application program stored in nonvolatile memory 240 into RAM 220 (step 690).

As described herein before, using the television based on the operating system according to the preferred embodiment of the present invention an initial screen can be displayed before a system booting is completely performed. Therefore, the viewer can view the television without waiting for a long time.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A television based on an operating system, comprising:
    a first memory storing a boot loader program, the boot loader program performing a booting function including a hardware basic test and loading the operating system in a random access memory;
    a television signal processing portion receiving a television broadcast and outputting audio and video signals corresponding to the television broadcast;
    a second memory storing a MPEG (Moving Picture Experts Group) control program and channel information, the MPEG control program driving the television signal processing portion to process a received television broadcast corresponding to the stored channel information; and
    a central processing unit executing the boot loader program, said boot loader program passing control over to said MPEG control program after the hardware basic test is performed, said MPEG control program passing control back to said boot loader program after driving the television signal processing portion to processing the television broadcast corresponding to the stored channel information, thereafter said boot loader program loading the operating system into the random access memory.

2. The television as set forth in claim 1, wherein the first memory is a read only memory.

3. The television as set forth in claim 1, wherein the second memory is a nonvolatile memory.

4. The television as set forth in claim 1, wherein the second memory is one of a flash memory and an EEPROM.

5. The television as set forth in claim 1, wherein the first and second memories are separate memory regions of the same memory.

6. The television as set forth in claim 5, wherein the first and second memories are one of a flash memory and an EEPROM.

7. The television as set forth in claim 1, wherein the second memory further stores volume information.

8. The television as set forth in claim 1, wherein the television signal processing portion is a television card including a tuner, a channel decoder, a demultiplexer, audio and video decoders, and first and second digital-to-analog converters.

9. A method of initially displaying on a screen of a television based on an operating system a video signal corresponding to a television broadcast, said method comprising the steps of:
    executing a boot loader program for performing a booting operation including a hardware basic test and loading the operating system in a random access memory;
    said boot loader program passing control over to a MPEG (Moving Picture Experts Group) control program after the hardware basic test is performed;
    said MPEG control program driving a television signal processing card to process a received television broadcast corresponding to preset channel information; and
    said MPEG control program passing control back to said boot loader program after driving the television signal processing portion to process the television broadcast corresponding to the preset channel information; and
    said boot loader program completing the booting operation by loading the operating system into said random access memory.

10. The method as set forth in claim 9, further comprising the steps of:
    reading a first memory having said boot loader program stored therein; and
    reading a second memory having the MPEG control program and the preset channel information stored therein.

11. The method as set forth in claim 10, wherein the first memory is a read only memory (ROM).

12. The method as set forth in claim 10, wherein the second memory is a nonvolatile memory.

13. The method as set forth in claim 10, wherein the second memory is one of a flash memory and an EEPROM.

14. The method as set forth in claim 10, wherein the first and second memories are separate memory regions of the same memory.

15. The method as set forth in claim 14, wherein the first and second memories are one of a flash memory and an EEPROM.

16. The method as set forth in claim 10, further comprising a step of reading the second memory to obtain preset volume information stored therein.

17. The method as set forth in claim 10, wherein said MPEG control program initializes a channel decoder, a demultiplexer, an audio decoder and a video decoder of said television signal processing card and further sets audio and video program IDs in said demultiplexer.

18. The method as set forth in claim 11, further comprising the steps of:
   determining whether an additional ROM exists;
   performing said step of said boot loader program completing the booting operation by loading the operating system into said random access memory, when it is determined that additional ROM does not exist;
   checking whether an audio/video present flag is set, when it is determined that additional ROM does exist;
   performing said step of said boot loader program completing the booting operation by loading the operating system into said random access memory, when it is determined that the audio/video present flag is not set; and
   performing said step of said boot loader program passing control over to the MPEG control program, when it is determined that the audio/video present flag is set.

19. A method of initially displaying on a screen of a television based on an operating system a video signal corresponding to a television broadcast, said method comprising the steps of:
   reading a read only memory (ROM) having said boot loader program stored therein;
   executing said boot loader program for performing a booting operation including a hardware basic test and loading the operating system in a random access memory
   reading an additional ROM having a MPEG (Moving Picture Experts Group) control program and preset channel and volume information stored therein, said boot loader program passing control over to the MPEG control program after the hardware basic test is performed;
   said MPEG control program driving a television signal processing card to process a received television broadcast corresponding to the preset channel and volume information; and
   said MPEG control program passing control back to said boot loader program after driving the television signal processing portion to process the television broadcast corresponding to the preset channel and volume information; and
   said boot loader program completing the booting operation by loading the operating system into said random access memory.

20. The method as set forth in claim 19, further comprising the steps of:
   determining whether said additional ROM exists;
   performing said step of said boot loader program completing the booting operation by loading the operating system into said random access memory, when it is determined that additional ROM does not exist;
   checking whether an audio/video present flag is set, when it is determined that additional ROM does exist;
   performing said step of said boot loader program completing the booting operation by loading the operating system into said random access memory, when it is determined that the audio/video present flag is not set; and
   performing said step of said boot loader program passing control over to the MPEG control program, when it is determined that the audio/video present flag is set.

* * * * *